Patented May 11, 1943

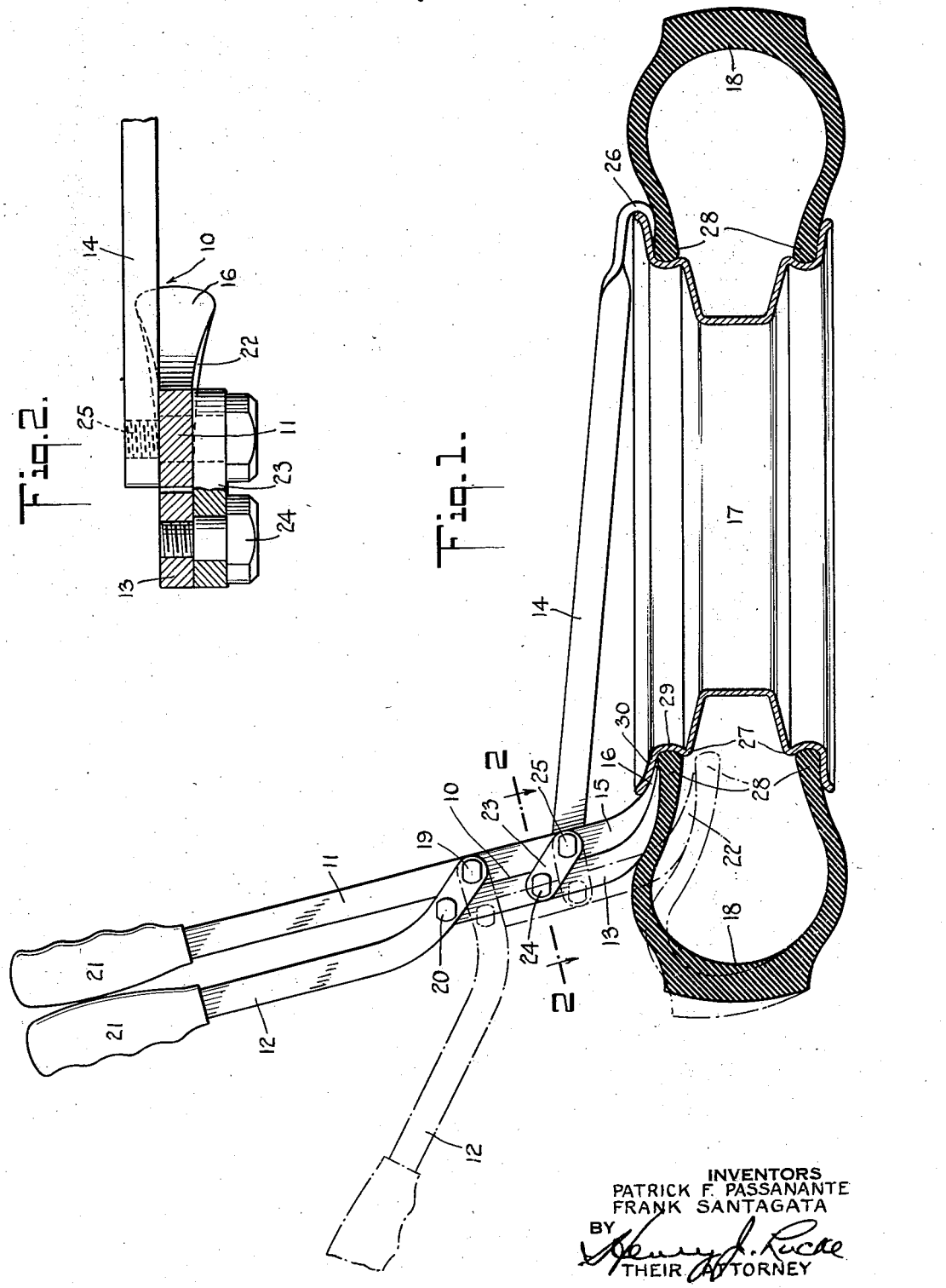

2,319,155

UNITED STATES PATENT OFFICE 2,319,155

TIRE REMOVER

Patrick F. Passanante and Frank Santagata, Brooklyn, N. Y.

Application July 24, 1941, Serial No. 403,792

2 Claims. (Cl. 157—6)

This invention relates to a tire removing device.

More particularly the invention relates to a device for removing motor vehicle tires from wheels provided with safety rims. Said safety rims, adapted to receive the bead of a tire, are in turn beaded to form a groove between the inner bead and the outer wall of the wheel, which positively holds the tire in place, even though it be deflated.

Though the wheels with safety rims are an improvement over regular automobile wheels, preventing tires from rolling off after blowouts or puncture, they seat the tires so securely within the grooved rim that it is very difficult to remove the tire from the rim, when desired, with the majority of tools known to the art. The invention is particularly adapted to overcome this difficulty.

An object of the invention is to incorporate into one device a system of levers to effect a quick and efficient removal of a tire from a beaded rimmed wheel.

A further object of the invention is to make the device of standard machined material thus obtaining economy of production.

A still further object of the invention is to design the device to fold compactly when not in use, thus facilitating storing the same.

Further features and objects of the invention will be more fully understood from the following detail description and the accompanying drawing, in which Fig. 1 is a side elevation of the tire remover in use removing a tire (which is shown in section) from a beaded rimmed wheel. This two positional view shows clearly the action of the tire remover on the tire.

Fig. 2 is a sectional top plan view showing the wedge shaped member of the tire remover taken on line 2—2 of Fig. 1.

Referring to the drawing, the tire remover 10 illustrating a preferred embodiment of my invention, is shown comprising a system of levers 11, 12, 13 and a hook member 14. The lever and hook members may be machined from steel bars of appropriate size for the intended use. A larger size device may be employed for truck, bus and airplane tires and a smaller size for regular passenger car use.

The lever 11 is provided with a curved portion 15 to enable its wedge shaped terminal 16 to be inserted between the wheel 17 and the tire 18. Lever 12 is shorter than lever 11 and is curved to be pivotally mounted upon lever 11 as by bearing screw 19. Levers 12 and 13 are also pivotally joined as by bearing screw 20. Levers 11 and 12 may be equipped with rubber handles 21, 21 or the like.

Lever 13, pivotally mounted upon lever 12 as by bearing screw 20 is adapted to lie rearwardly flush with lever 11 and is curved to conform to the contiguous face of lever 11, see 15 and 16, Fig. 2, so that its wedge-like member 22 lies under wedge 16 and, in use, rests upon the upper side wall of the tire 18.

Link 23 pivotally joins lever 13 at bearing screws 24 and 25 with lever 11, and at the same time bearing screw 25 joins lever 11 with hook member 14. The fabricated steel bar 14 is provided at its free end with an in-turned and preferably curved hook 26, shown in use in Fig. 1, adapted to be hooked about the outer wall of the wheel 17 at a position diametrically opposite that of wedge members 16 and 22 of levers 11 and 13.

Fig. 1 shows the tire remover in use, graphically illustrating the method of removing a tire from a grooved-rimmed wheel, the full line representation showing the initial position of the stated parts and the dot-and-dash outline showing the stated parts in fully operated position. The tire 18 when inflated and mounted upon the wheel 17 has its beads 28 seated under pressure against the respective walls 30 of the wheel 17. When deflated, either through accident such as blowout or puncture, or by purposeful design, the sturdy, unstretchable beads 28 by reason of their construction are still firmly secured within the respective grooves 29 between each outer wall 30 and inner bead 27 of the wheel 17; resistance against dislocation from said grooves 29 arises not only because the compression of the tire and its beads within the outer walls of the wheel which is a factor where the tire is mounted on a wheel having a flat rim, and this resistance is definitely increased by the rim beads 27 of present-day safety rims.

When taken from stored position for use in removing a tire from its rim, the arm bar 14 lies folded laterally flush with lever 11 and is then lowered into position to allow hook 26 of bar 14 to engage the lip of the outer wall 30 of the wheel 17. By grasping the now adjacent handles 21, 21, the parallel levers 11, 12 are placed in forward position with the wedge members 16, 22, resting on the tire diametrically opposite to the engaged hook. The handles 21, 21 on levers 11, 12 are now drawn back in unison toward the user; by so doing the grip upon the outer wall 29 of wheel 17 is increased. The wedge members 16, 22 of said levers 11 and 13 in contiguous position are located upon the wheel diametrically opposite of the inserted hook 26, and are entered between outer wall 30 and the upper wall of tire 18.

Holding lever 11 braced in such fixed position, the lever 12 is now thrust downwardly and outwardly to effect the lowering of lever 13 which presses upon the tire 18 at the location 22 and forcibly pushes the tire inwardly of the wheel, thus dislodging the concerned tire bead 28 from the grooved rim 29 and past the rim bead 27 in one easy, efficient operation.

When not in use, the hook member 14 of the tire remover may be swung back to lie laterally flush with lever 11 and may be stored for future use in such compact manner.

Whereas we have described our invention by reference to specific forms thereof, it will be understood that many changes and modifications may be made provided they do not depart from the scope of the claims.

We claim:

1. A device for removing a beaded tire from a mounting rim, comprising a lever having a handle thereon, the free end thereof being provided with a curvedly pointed element, a second lever having a handle thereon and pivotally related to said first-named lever, said second-named lever having a curved formation at its pivoted end, a third lever pivotally secured to said first and said second-named levers and having a curvedly pointed element disposed immediately adjacent said first-named pointed element, and a hook member pivotally secured to said first-named lever.

2. A device for removing a beaded tire from a mounting rim, comprising a lever having a handle thereon, the free end of said lever being provided with a curvedly pointed element, a second lever having a handle thereon and pivotally related to said first-named lever, said second-named lever having a curved formation at its pivoted end, a third lever pivotally secured to said first and said second-named levers and having a curvedly pointed element disposed immediately adjacent the curvedly pointed element of said first-named lever, said pointed elements being arranged to be inserted between the rim of a wheel and the bead of a tire thereon, and a hook member, including a link, pivotally secured to said first-named lever and by means of said link to said third-named lever and arranged to grip the rim of the wheel at a location opposite that gripped by said curvedly pointed elements, whereby upon lowering of the second-named lever the third-named lever is arranged to remove the tire bead from the wheel rim.

PATRICK F. PASSANANTE.
FRANK SANTAGATA.